United States Patent
Kim et al.

(10) Patent No.: US 10,316,958 B2
(45) Date of Patent: Jun. 11, 2019

(54) SYSTEM AND METHOD FOR ELECTRIC OIL PUMP CONTROL OF HYBRID ELECTRIC VEHICLE

(71) Applicants: Hyundai Motor Company, Seoul (KR); Kia Motors Corporation, Seoul (KR)

(72) Inventors: Yoh Han Kim, Seoul (KR); Jungwoo Seo, Gyeonggi-do (KR); Jung Wan Choi, Gyeonggi-do (KR)

(73) Assignees: Hyundai Motor Company, Seoul (KR); Kia Motots Corporation, Seoul (KR)

( * ) Notice: Subject to any disclaimer, the term of this patent is extended or adjusted under 35 U.S.C. 154(b) by 306 days.

(21) Appl. No.: 15/336,672

(22) Filed: Oct. 27, 2016

(65) Prior Publication Data
US 2018/0051801 A1    Feb. 22, 2018

(30) Foreign Application Priority Data

Aug. 22, 2016 (KR) .................. 10-2016-0106148

(51) Int. Cl.
*F16H 61/00* (2006.01)
*B60K 6/22* (2007.10)
(Continued)

(52) U.S. Cl.
CPC .......... *F16H 61/0025* (2013.01); *B60K 6/22* (2013.01); *B60K 6/48* (2013.01); *F16H 61/0202* (2013.01); *B60K 2006/4825* (2013.01); *B60Y 2200/92* (2013.01); *B60Y 2300/18108* (2013.01); *B60Y 2306/03* (2013.01); *F16H 59/44* (2013.01); *F16H 59/48* (2013.01); *F16H 59/66* (2013.01); *F16H 59/70* (2013.01); *F16H 2059/366* (2013.01); *F16H 2059/663* (2013.01);
(Continued)

(58) Field of Classification Search
None
See application file for complete search history.

(56) References Cited

U.S. PATENT DOCUMENTS

2003/0171867 A1* 9/2003 Nakamori ............. B60W 10/30
701/54
2008/0081730 A1* 4/2008 Lee ........................ B60K 6/26
477/15

(Continued)

FOREIGN PATENT DOCUMENTS

| JP | 07-174216 A | 7/1995 |
| KR | 10-1394040 B1 | 5/2014 |
| KR | 10-2015-0008328 A | 1/2015 |

*Primary Examiner* — Justin Holmes
(74) *Attorney, Agent, or Firm* — Mintz Levin Cohn Ferris Glovsky and Popeo, P.C.; Peter F. Corless

(57) ABSTRACT

A system and method for electric oil pump control of hybrid electric vehicle are provided. The system includes a driving information detector that is configured to detect driving information according to driving of the hybrid vehicle and an operation type transmission of an electric oil pump (EOP) that receives and supplies transmission oil for operating a clutch. A controller analyzes the driving information, and detects an oil skew phenomenon and enters the EOP speed increasing mode when the hybrid vehicle stops by rapid braking, and increases the EOP speed to increase temporary oil absorption power during rapid starting in a predetermined reference period of time.

12 Claims, 7 Drawing Sheets

(51) Int. Cl.
*F16H 61/02* (2006.01)
*B60K 6/48* (2007.10)
*F16H 59/44* (2006.01)
*F16H 59/48* (2006.01)
*F16H 59/66* (2006.01)
*F16H 59/70* (2006.01)
*F16H 59/36* (2006.01)

(52) U.S. Cl.
CPC ........ *Y02T 10/6221* (2013.01); *Y02T 10/6252* (2013.01); *Y10S 903/904* (2013.01)

(56) References Cited

U.S. PATENT DOCUMENTS

| | | | |
|---|---|---|---|
| 2012/0290158 A1* | 11/2012 | Yoshikawa | B60K 6/48 701/22 |
| 2016/0245373 A1* | 8/2016 | Kasuya | B60K 6/26 |
| 2017/0268662 A1* | 9/2017 | Song | F16H 61/0025 |

* cited by examiner

SYSTEM AND METHOD FOR ELECTRIC OIL PUMP CONTROL OF HYBRID ELECTRIC VEHICLE

CROSS-REFERENCE TO RELATED APPLICATION

This application claims priority to and the benefit of Korean Patent Application No. 10-2016-0106148 filed in the Korean Intellectual Property Office on Aug. 22, 2016, the entire contents of which are incorporated herein by reference.

BACKGROUND

(a) Field of the Disclosure

The present disclosure relates to a system and method for electric oil pump control of hybrid electric vehicle, and more particularly, to a system and method for electric oil pump control of hybrid electric vehicle that prevent launch delay during restart after rapid braking of the hybrid vehicle.

(b) Description of the Related Art

Generally, a hybrid vehicle (e.g., Hybrid Electric Vehicle/Plug-in Hybrid Electric Vehicle, HEV/PHEV) is a vehicle that uses at least two different power sources and is operated by an engine that obtains operating power through fuel combustion and a motor that obtains operating power through battery power. Automatic transmission fluid (ATF, hereinafter oil for convenience) is skewed in one direction when rapid braking occurs during high speed driving of hybrid vehicle. At this time, an intake unit that supplies oil for clutch engagement is temporarily exposed at air by oil skew phenomenon.

In particular, about at least two seconds is required for returning to an original state after oil skew in one direction, and when a driver restarts the vehicle (e.g., rapid start), air instead of oil is received in a clutch, and thus, the clutch is not capable of being engaged. In other words, oil skew phenomenon by rapid braking of the vehicle delays oil supply for operation of the clutch and thus, the clutch is not able to be engaged and power delivery is not possible, therefore the vehicle cannot start immediately and starting delay occurs.

Meanwhile, FIG. 1 is a comparative graph of a normal oil supply state of automatic transmission with abnormal oil supply delay state of vehicle. Referring to FIG. 1, when oil is supplied normally, the clutch is engaged to an operation shaft to deliver engine power and synchronize a motor speed and engine speed. However, when oil is not normally supplied, the clutch is not able to be engaged to the operation shaft to deliver power since hydraulic pressure is insufficient, therefore the vehicle is not able to start immediately and starting is delayed. Additionally, desynchronizing in which a gap between the motor speed and engine speed increases is generated by motor speed divergence, therefore time delay occurs for the engine speed to be increased to the motor speed and the starting delay increases.

Meanwhile, to solve this problem, it has been considered that oil is additionally injected such that intake unit is not exposed when oil is skewed in one direction during rapid braking. For example, FIG. 2 illustrates oil skew state of mechanical oil pump (MOP) in a gasoline vehicle according to the related art. Referring to FIG. 2, the engine shaft and the mechanical oil pump are connected by one shaft and oil skew state occurs in a gasoline vehicle according to the related art. In particular, since discharge amount of the mechanical oil pump is set, flow rate that remained on a lower surface increases to a maximum and air exposure of the oil intake unit has to be minimized.

Accordingly, line pressure has to be decompressed from high pressure to low pressure such that flow rate transmitted to the clutch is limited and the remaining pressure is bypassed to a hydraulic line, so flow amount remains substantially the lower part of the transmission. However, this requires additionally injecting unnecessary oil for a certain mode, thus causing deterioration in fuel efficiency by increasing churning drag during additional oil injection. Accordingly, it is necessary to prevent launch delay during restarting after rapid braking of hybrid vehicle without fuel efficiency deterioration by additional oil injection.

The above information disclosed in this section is merely for enhancement of understanding of the background of the disclosure and therefore it may contain information that does not form the prior art that is already known in this country to a person of ordinary skill in the art.

SUMMARY

An exemplary embodiment of the present disclosure provides a system and method for electric oil pump control of hybrid electric vehicle, which prevent starting delay by recognizing vehicle driving mode and compensating abrupt flow rate supply by electric oil pump (EOP) speed increasing during restarting in a predetermined time after rapid braking.

According to an aspect of the present disclosure, a system for electric oil pump control of hybrid electric vehicle may include a driving information detector configured to detect driving information based on driving of the hybrid vehicle (e.g., a driving state), an operation type transmission of electric oil pump (EOP) configured to receive and supply transmission oil for operating a clutch, and a controller configured to analyze the driving information, and detect oil skew phenomenon and enter the EOP speed increasing mode when the hybrid vehicle stops by rapid braking, and increase the EOP speed to increase temporary oil absorption power during rapid starting in a predetermined reference time.

Additionally, the driving information detector may be configured to detect at least one driving information selected from the group consisting of an operational displacement of brake pedal, operational displacement of acceleration pedal, vehicle speed, vehicle acceleration, shift speed, engine speed, motor speed, and road tilt angle. The transmission may include an oil pan preserving oil at a lower surface and forming horizontal oil fluid surface in normal state, an EOP configured to suction or receive oil from an oil intake unit submerged in the oil fluid surface by torque of the motor, a valve body configured to supply the oil received from the EOP to a clutch for connecting with an operation shaft and the transmission, and a pump operation unit including a relay configured to switch electricity supply of the EOP based on an applied control signal.

Further, the controller may be configured to determine that rapid braking of the vehicle occurs when the vehicle acceleration is greater than predetermined reference acceleration by braking operation during driving. The controller may also be configured to determine that vehicle stopping occurs by the rapid braking when the vehicle speed is less than a predetermined reference speed in a rapid braking state. The controller may be configured to operate as the EOP speed increasing mode for a predetermined reference time when the vehicle stopping which vehicle speed is less than a predetermined reference speed occurs in the rapid braking state.

The controller may further be configured to determine that vehicle rapid starting occurs when brake off signal is detected in the predetermined reference time. The controller may then be configured to multiple a basic EOP speed by increasing amount of predetermined multiples to increase EOP speed. In particular, the controller may be configured to increase the increasing amount of the basic EOP speed based on an increase of vehicle acceleration during rapid braking of the vehicle. In addition, the controller may be configured to increase the increasing amount of the EOP speed and the increasing control time so much as that oil skew phenomenon is added by the road tilt angle.

According to another aspect of the present disclosure, a method for electric oil pump (EOP) control of hybrid electric vehicle may include detecting driving information based on driving of the hybrid vehicle, analyzing the driving information, and detecting an oil skew phenomenon and entering the EOP speed increasing mode when the hybrid vehicle stops by rapid braking, determining rapid starting of the vehicle when the vehicle restarts within a predetermined reference time after the vehicle stops in the EOP speed increasing mode, and increasing temporary oil absorption power by increasing the EOP speed based on the rapid starting of the vehicle.

Additionally, the analyzing of driving information may include detecting rapid braking of the vehicle when the vehicle acceleration is greater than a predetermined reference acceleration in a braking state, detecting vehicle stopping when the vehicle speed is less than a predetermined reference speed in a rapid braking state, and entering the EOP speed increasing mode the vehicle when the rapid braking and stopping conditions of the vehicle are satisfied. The rapid starting of the vehicle may be determined when brake release signal is input in a predetermined reference time in which fluid returns to an original state after the oil skew phenomenon occurs. The increasing of temporary oil absorption power may include increasing the EOP speed by multiplying a basic EOP speed by increasing amount of predetermined multiples according to vehicle acceleration. The method for electric oil pump control of hybrid electric vehicle may further include returning to an original EOP speed after continuing the increasing of the EOP speed for a predetermined period of time. Additionally, the EOP speed increasing mode may be released when rapid starting of the vehicle does not occur within the predetermined reference period of time.

According to an exemplary embodiment of the present disclosure, starting delay may be prevented caused by oil skew phenomenon in a transmission by abrupt oil absorption power through an EOP speed increasing control during restarting after rapid braking of the hybrid vehicle. The starting delay may be prevented without oil waste due to additional oil injection by substituting method of increasing oil amount for preventing starting delay according to oil skew phenomenon of the related art. Additionally, horizontal development may be possible in a various vehicles by sufficiently supplying clutch operation flow rate without starting delay during oil skew phenomenon by adding EOP speed increasing control logic without adding additional hardware.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DESCRIPTION OF SYMBOLS

Figure 1:
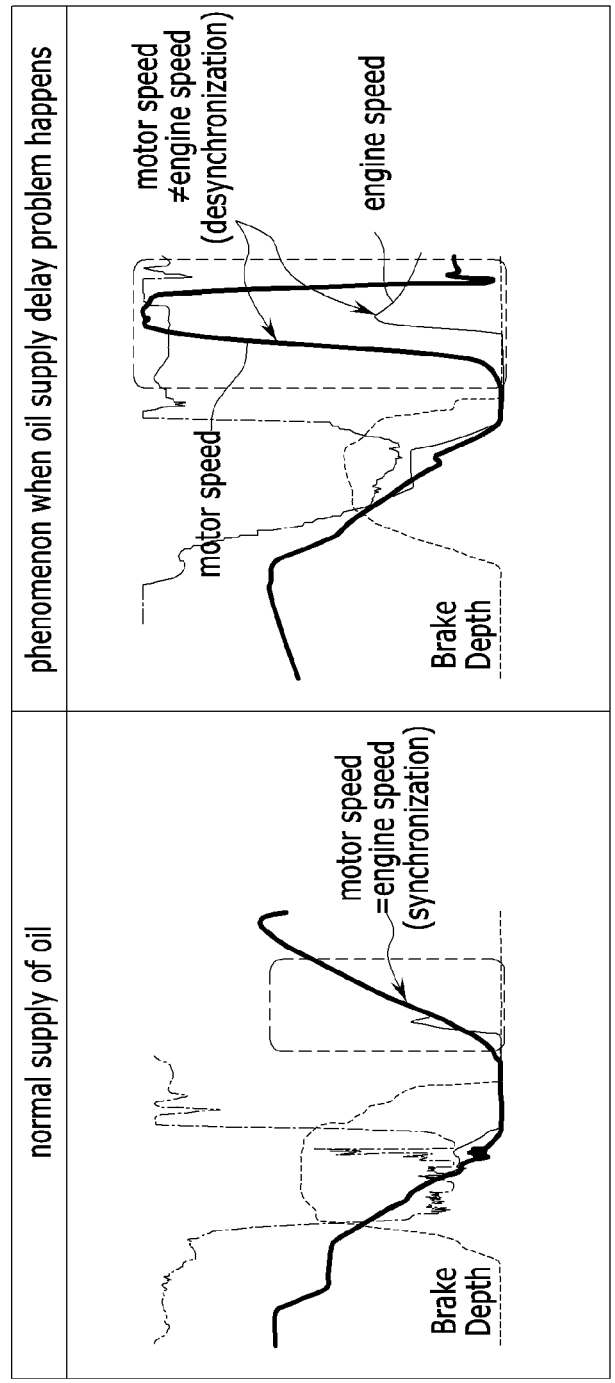
FIG. 1 is a graph comparison of vehicle operation states of normal state and delay state of automated transmission oil (ATF) supply according to the related art.
Figure 2:
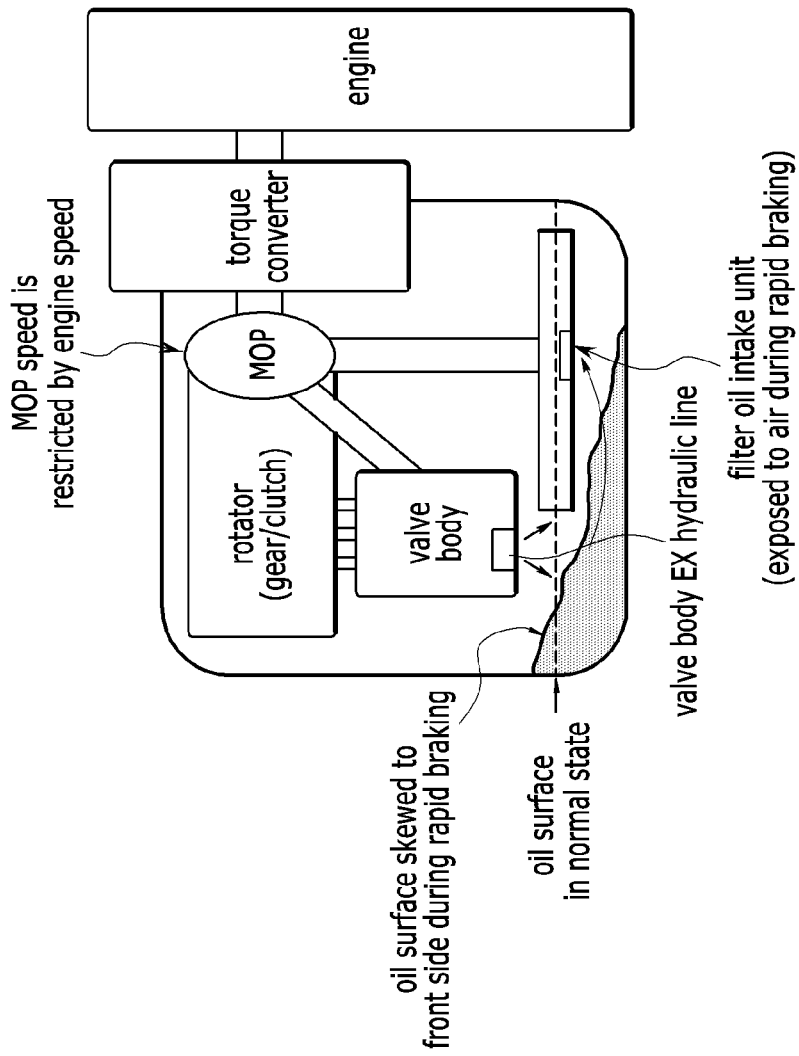
FIG. 2 illustrates oil skew state in mechanical oil pump (MOP) in a gasoline vehicle according to the related art.

100: electric hydraulic pump control system
110: driving information detector
120: hybrid control unit (HCU)
130: transmission
131: oil pan
132: electric oil pump (EOP)
133: oil intake unit
134: valve body
135: pump operation unit (OPU)
136: controller
140: transmission control unit (TCU)

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. It is understood that the term "restart" used herein means that the vehicle restarts in a predetermined short time after rapid braking and used as same meaning of "rapid start".

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, only exemplary embodiments of the present disclosure have been shown and described, simply by way of illustration. As those skilled in the art would realize, the described exemplary embodiments may be modified in various different ways, all without departing from the spirit or scope of the present disclosure. Accordingly, the drawings and description are to be regarded as illustrative in nature and not restrictive. Like reference numerals designate like elements throughout the specification.

In addition, unless explicitly described to the contrary, the terms "-er", "-or" and "module" described in the specification mean units for processing at least one function and operation and can be implemented by hardware components or software components and combinations thereof.

Hereinafter, a system and method for electric oil pump control of hybrid electric vehicle according to an exemplary embodiment of the present disclosure will be described in detail with reference to the accompanying drawings.

Figure 3:
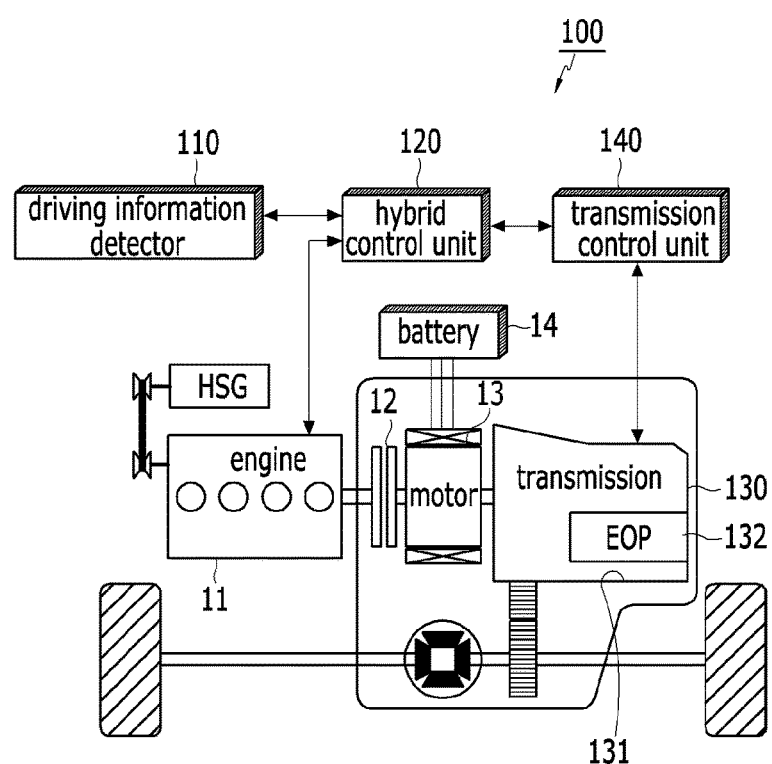
FIG. 3 is a schematic drawing of a system for electric oil pump control of hybrid electric vehicle according to an exemplary embodiment of the present disclosure.

FIG. 3 is a schematic drawing of a system for electric oil pump control of hybrid electric vehicle according to an exemplary embodiment of the present disclosure. Referring to FIG. 3, a system for electric oil pump control of hybrid electric vehicle 100 according to an exemplary embodiment of the present disclosure may include a driving information detector 110, a hybrid control unit (HCU) 120, a transmission 130, and a transmission control unit (TCU) 140.

In particular, the driving information detector 110 may be a sensor and may be configured to detect overall driving information based on driving of the hybrid vehicle (e.g., various vehicle states) to provide the information to the hybrid control unit 120. The driving information detector 110 may further be configured to detect driving information using at least one of a brake pedal sensor (BPS) configured to detect operational displacement of a brake pedal (e.g., engagement degree of pedal or amount of pressure exerted onto pedal), an accelerator pedal sensor (APS) configured to detect operational displacement of the acceleration pedal (e.g., engagement degree of pedal or amount of pressure exerted onto pedal, a vehicle speed sensor configured to detect vehicle speed, an acceleration sensor configured to detect vehicle acceleration, shift speed sensor configured to detect a currently engaged shift speed, a revolutions per minute (RPM) sensor configured engine 11 speed, a resolver configured to detect speed of a motor 13 that supplies operational power and angle of a rotator, and a gradient sensor configured to measure a road inclination.

The hybrid control unit 120 may be an upper controller and may be configured to operate various other controllers such as an engine control unit (ECU), a motor control unit (MCU), a transmission control unit (TCU), a battery management system (BMS), a direct-current (DC) converter (LDC) and the like. The hybrid control unit 120 may connect respective controllers with high speed controller area network (CAN) communication to transmit and receive mutual information and adjust cooperatively output torque of the engine 11 and the motor 13. The hybrid control unit 120 may also be configured to detect driver requirement torque detected from the driving information detector 110 and state of change (SOC) of a battery 14 in an EV mode driving state after vehicle start-up to determine engine start-up when conversion to HEV mode is required. Further, a clutch 12 installed between the engine 11 and the motor 13 may be combined to control driving in the HEV mode.

The hybrid control unit 120 may be configured to calculate the driver requirement torque by APS replacement value from engagement of the acceleration pedal. The hybrid control unit 120 may further be configured to calculate the driver requirement torque by reflecting an ascent/descent (e.g., incline/decline) gradient when the vehicle is being driven on an inclined road (e.g., a sloped road). Additionally, the hybrid control unit 120 may be configured to determine engine start-up for conversion to HEV mode when the calculated driver requirement torque is greater than a critical torque required to enter HEV mode. The hybrid control unit 120 may also be configured to determine engine start-up for conversion to HEV mode when SOC of the battery according to EV driving is reduced to be under critical SOC necessary to develop by engine.

The battery 14 may include a plurality of unit cells, and high voltage, for example DC about 400V to 450V, for supplying voltage to the motor 13 may be preserved in the battery 14. A motor control unit (MCU) composed of a plurality of power switching element may be disposed between the battery 14 and the motor 13 to convert DC voltage supplied from the battery 14 based on a control signal applied from the hybrid control unit 120 to a 3 phase alternating current (AC) voltage to operate the motor 13.

The motor 13 is configured to generate torque by being operated by the 3 phase AC voltage, and the motor 13 may be operated as a generator to supply restoration energy to the battery 14. The engine 11 is configured to output engine power of start-up on state as a power source. The hybrid control unit 120 may be configured to operate the engine 11 by the engine controller and may be configured to monitor an operating state (e.g., engine RPM, engine torque). The clutch 12 may be disposed between the engine 11 and the motor 13 to provide driving in the EV mode and HEV mode. The clutch 12 may release connection between the engine 11 and the driving shaft in the EV mode, and may connect or combine the engine 11 and the driving shaft during conversion of the HEV mode when the driver requires acceleration again to transmit driving power of the engine 11. The transmission 130 may be composed of automatic transmission (AT) or dual clutch transmission (DCT), and may be configured to adjust gear ratio according to operation of transmission control unit 140.

In an exemplary embodiment of the present disclosure, the transmission 130 may be equipped as a driving type transmission of electric oil pump (EOP) 132 as an improving agent suggestion regarding starting delay during restart after rapid braking of the vehicle. Particularly, the EOP 132 may be configured to receive or suction oil from the oil pan 131 under the transmission 130 using the oil intake unit to supply oil for operation of the clutch 12 and the transmission. The transmission control unit 140 may be configured to automatically adjust target shift speed of the transmission 130 determined based on a vehicle speed, throttle opening, input torque etc. to maintain vehicle speed suitable to a current driving condition.

Further, the transmission control unit 140 according to an exemplary embodiment of the present disclosure may be configured to increase EOP 132 speed when a restart situation is detected within a predetermined period of time after stop during high speed driving of the vehicle based on driving information collected using the hybrid control unit 120. In particular, when the hybrid vehicle enters EV mode by rapid braking to stop in a clutch release state which the engine 11 is separated from the operation shaft, the vehicle has to enter HEV mode again when the driver releases or disengages brake and engages the acceleration pedal for reacceleration. Accordingly, in the hybrid vehicle, the clutch at the engine side has to be connected with the operation shaft again, and oil for clutch operation hydraulic pressure has to be supplied from the EOP for connection.

In the related art, restart situation is detected when the oil skew phenomenon occurs where clutch engagement is not possible since air is suctioned such that engine power delivery is not possible. Thus, the transmission control unit 140 according to an exemplary embodiment of the present disclosure is configured to detect oil skew phenomenon in the transmission 130 when the vehicle stops by rapid braking, and detect that the oil intake unit 133 of the EOP 132 is exposed to the air to enter EOP speed increasing mode.

Further, the transmission control unit 140 may be configured to increase the EOP speed to increase temporary oil intake power when the transmission control unit 140 enters the EOP speed increasing mode and restarts the vehicle within a predetermined reference period of time. Accordingly, oil may be rapidly suctioned compared to general suction through a straw effect by the intake load increase according to increasing the EOP speed, and thus, starting delay caused by air intake may be prevented and the vehicle may be restarted immediately.

Figure 4:
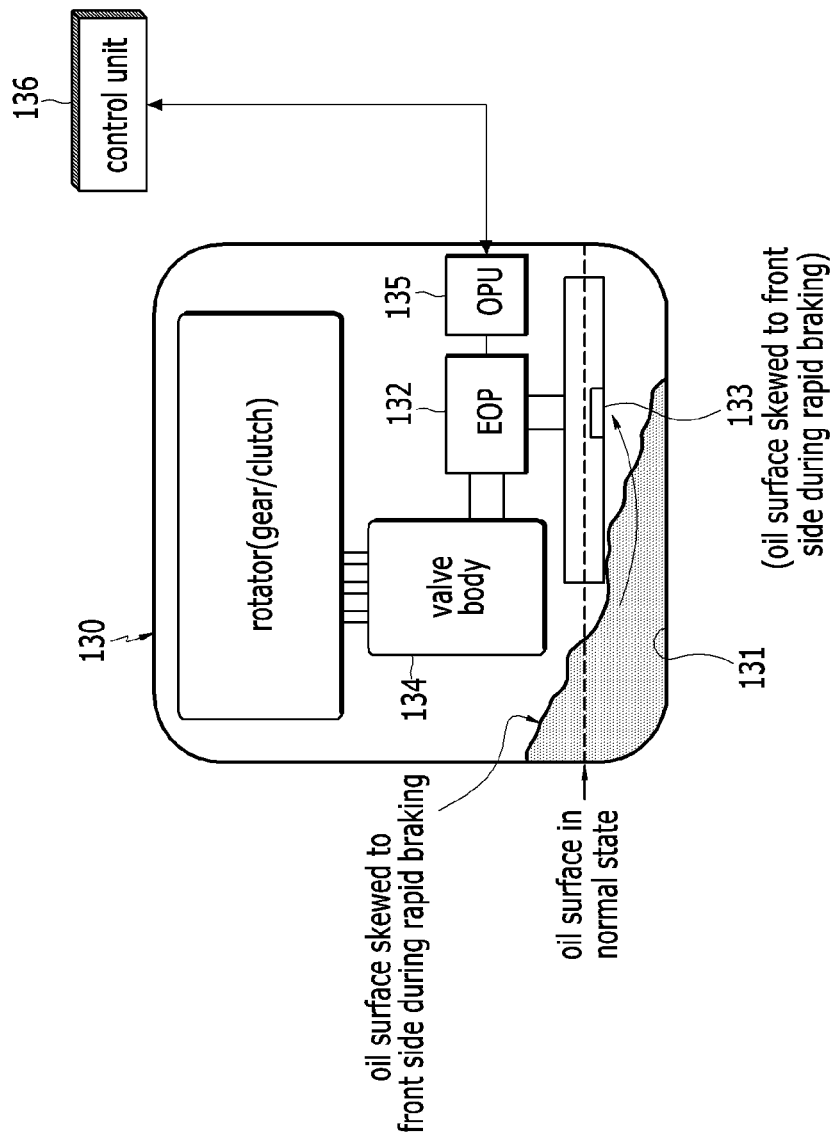
FIG. 4 is a schematic drawing of an inside of transmission for electric oil pump control of hybrid electric vehicle according to an exemplary embodiment of the present disclosure.

Moreover, FIG. 4 is a schematic drawing of an inside of transmission for electric oil pump control of hybrid electric vehicle according to an exemplary embodiment of the present disclosure. Referring to FIG. 4, a transmission 130 according to an exemplary embodiment of the present disclosure may include an oil pan 131, an EOP 132, an oil intake unit 133, a valve body 134, an oil pump unit (OPU) 135, and a controller 136.

The oil pan 131 may preserve or store oil on the under surface of the transmission 130 and may form a horizontal oil surface in a normal state. The EOP 132 may be configured to generate rotational power of the motor to receive (e.g., suction, intake, etc.) oil through the oil intake unit 133 submerged in the oil surface of the oil pan 131 and supply the oil for operation of the clutch 12 and control of transmission. The EOP 132 may be operated separately from the engine unlike a mechanical oil pump (MOP), and may be configured to execute the EOP speed increasing mode when oil skew phenomenon occurs to thus increase the EOP speed to suction oil remaining under the surface of the oil pan 131 constrainingly. The valve body 134 may be configured to supply oil suctioned through the EOP 132 to the clutch 12 to connect with the operation shaft and transmission 130. The valve body 134 may be configured to adjust supply and release of hydraulic pressure supply and transmission to the clutch 12 and the transmission 130 using various hydraulic valves. The oil pump unit (OPU) 135 may include a relay to regulate electricity supply of the EOP 132 based on a received control signal.

Additionally, the controller 136 may be configured to electronically operate the EOP 132 speed by delivering the control signal to the oil pump unit 135. The controller 136 may include transmission control unit 140 as described above through FIG. 3 and the hybrid control unit 120 may be configured to directly operate the EOP 132. The controller 136 may also include an additional pump controller configured to transmit and receive information via CAN communication with the transmission control unit 140 or the hybrid control unit 120 which are high position controllers, and adjust EOP 132 speed (e.g., intake power) by the control signal received from the transmission control unit 140 or the hybrid control unit 120.

Figure 5:
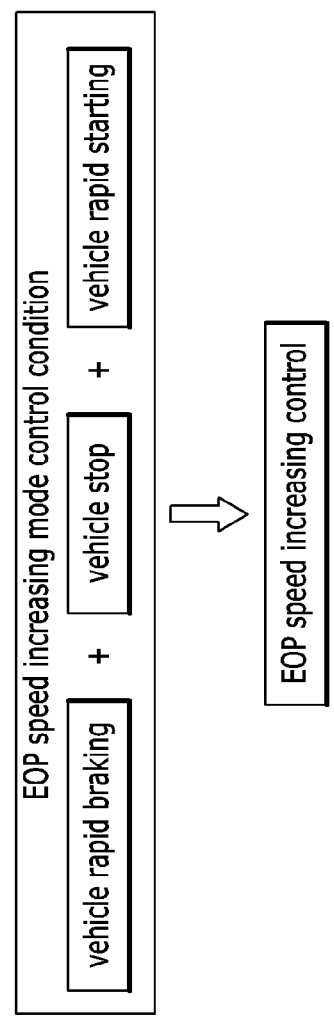
FIG. 5 illustrates EOP speed increasing mode control condition according to an exemplary embodiment of the present disclosure.

FIG. 5 illustrates EOP speed increasing mode control condition according to an exemplary embodiment of the present disclosure. Referring to FIG. 5, the controller 136 according to an exemplary embodiment of the present disclosure may be configured to execute the EOP speed increasing mode to increase intake power of the EOP 132 when the oil intake unit 133 of the EOP 132 is exposed to air. Particularly, the EOP speed increasing mode may be executed by the controller 136 in response to detecting rapid vehicle rapid, a vehicle stop, and rapid vehicle starting. For example, the controller 136 may be configured to detect rapid vehicle braking when vehicle acceleration (e.g., speed/time change rate) is greater than a predetermined reference acceleration (e.g., about 0.7 G). The controller 136 may also be configured to detect rapid vehicle stop when vehicle speed is less than a predetermined reference speed (e.g., about 5 km/h) when rapid vehicle braking occurs.

Furthermore, the controller 136 may be configured to detect that vehicle is not stopped (e.g., the speed is greater than 0) since oil intake unit 133 is not exposed to air when the vehicle accelerates again to greater than the predetermined reference speed during rapid braking. The controller 136 may be configured to detect rapid vehicle starting when a restarting signal (e.g., BPS OFF signal) is detected within a predetermined reference period of time (e.g., about 2 seconds) after the vehicle stops in rapid braking. Additionally, the controller 136 may be configured to detect that additional action is not necessary since oil surface is stabilized above the reference time though the oil intake unit 133 is exposed to air by oil skew phenomenon due to rapid vehicle braking.

Accordingly, the controller 136 may be configured to execute the EOP speed increasing mode when the three conditions are satisfied to compensate the EOP speed. The EOP speed compensation may be determined by predetermined multiples (e.g., basic EOP speed x increasing amount) of basic EOP speed input data (e.g., mapped value by CAL) predetermined in a normal mode. Additionally, in the EOP speed compensation, basic EOP speed increasing amount may be increased according to increase of the vehicle acceleration since the oil skew phenomenon is substantially caused by rapid braking.

Figure 6:
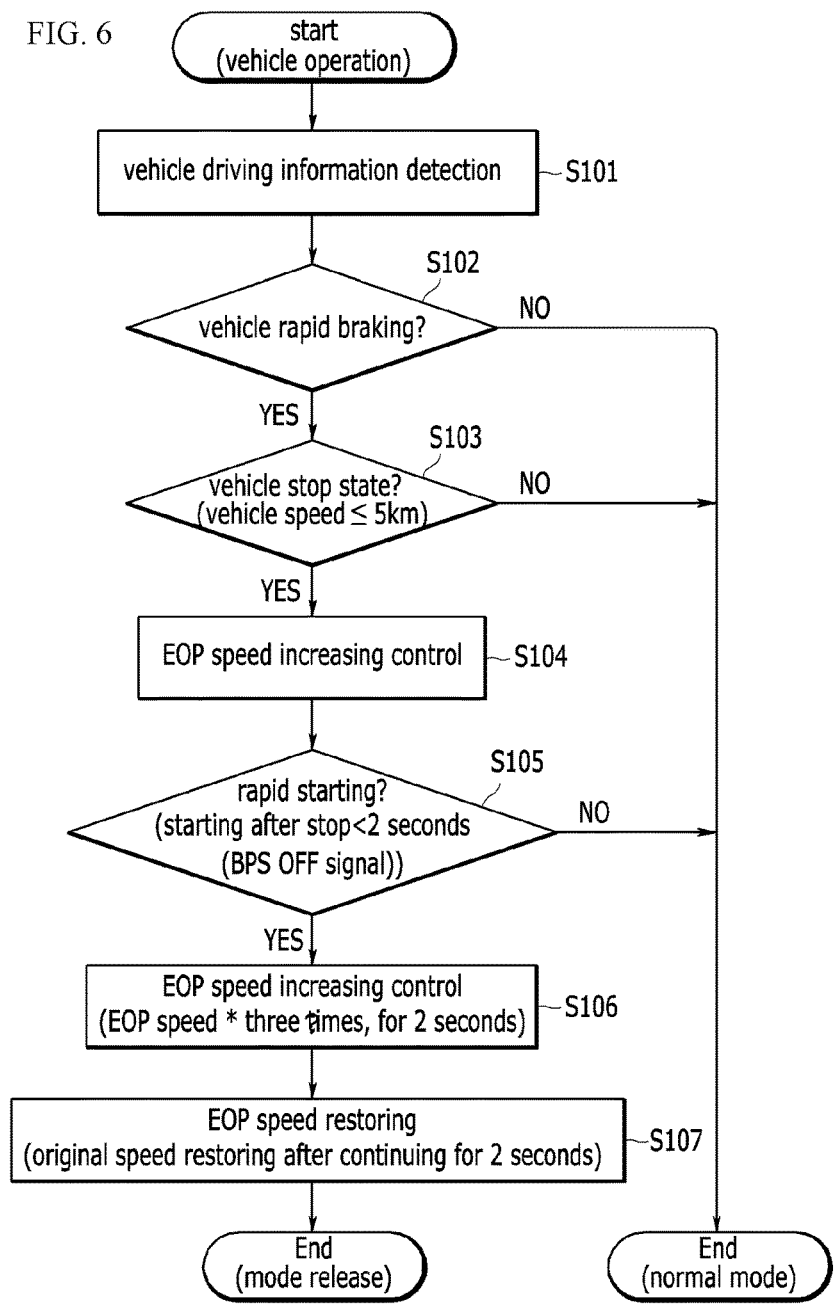
FIG. 6 is a flowchart of a method for electric oil pump control of hybrid electric vehicle according to an exemplary embodiment of the present disclosure.

Meanwhile, a method for electric oil pump control of hybrid electric vehicle based on the system for electric oil pump control of hybrid electric vehicle according to an exemplary embodiment of the present disclosure described above will be describe referring to FIG. 6 below. FIG. 6 is a flowchart of a method for electric oil pump control of hybrid electric vehicle according to an exemplary embodiment of the present disclosure. The method described herein below may be executed by an overall controller having a processor and a memory. Referring to FIG. 6, the system 100 for electric oil pump control of hybrid electric vehicle according to an exemplary embodiment of the present disclosure may be configured to monitor a driving state by detecting vehicle driving information when the vehicle starts S101.

Particularly, the system 100 may be configured to determine rapid vehicle braking when vehicle acceleration is greater than a predetermined reference acceleration (e.g., about 0.7 G) when the brake is operated (BPS ON) S102. The system 100 may also be configured to detect that vehicle is stopped when vehicle speed is less than a predetermined reference speed (e.g., 5 km/h) when rapid vehicle rapid occurs S103.

Further, the system 100 may be configured to detect that the oil intake unit 133 is exposed to air to enter EOP speed increasing mode S104. The system 100 may be configured to determine that rapid vehicle starting occurs when the vehicle restarts within a predetermined reference period of time after the vehicle stops in the EOP speed increasing mode S105. For example, the system 100 may be configured to detect rapid vehicle starting when a brake off (BPS OFF) signal is input within at least 2 seconds of the vehicle braking rapidly and stops such that fluid returns original position after oil skew phenomenon occurs.

The system 100 may further be configured to increase the EOP 132 speed according to rapid vehicle starting in the EOP speed increasing mode S106. For example, the controller 136 may be configured to increase the EOP 132 speed for a predetermined period of time as three times as the speed of basic EOP speed in a normal mode to increase oil intake power through straw effect. In other words, the controller 136 may be configured to increase the EOP 132 speed to be three times greater than the basic (e.g., original) EOP speed to increase the oil intake. The system 100 may then be configured to return the EOP to an original EOP speed after continuously increasing the EOP 132 speed for a predetermined period of time S107. The system 100 may be configured to continue the speed increase for a predetermined period of time such that fluid returns to an original position and may be configured to release the EOP speed increasing mode when oil surface is in normal state.

Moreover, the system 100 may be configured to adjust the EOP 132 speed in a normal mode when rapid vehicle braking condition is not satisfied in S102 (No) or when vehicle stop condition is not satisfied in S103 (No). In addition, the system 100 may be configured to determine that oil surface is stabilized to adjust EOP 132 speed in a normal mode when the rapid vehicle braking condition is not satisfied in S105 (No). Similarly, according to an exemplary embodiment of the present disclosure, starting delay may be prevented due to oil skew phenomenon in a transmission by abrupt oil absorption power through an EOP speed increasing control during restarting after rapid braking of the hybrid vehicle.

Further, the starting delay may be prevented without oil waste due to additional oil injection by substituting method of increasing oil amount for preventing starting delay according to the oil skew phenomenon of related art. In addition, horizontal development may be possible in a various vehicles by sufficiently supplying clutch operation flow rate without starting delay during oil skew phenomenon by adding EOP speed increasing control logic without adding additional hardware.

While the exemplary embodiments have been described, the present disclosure is not limited to the exemplary embodiments, and may be variously modified. For example, in the description of the FIG. 5, EOP speed compensation may be determined by predetermined multiples (e.g., basic EOP speed x increasing amount) of basic EOP speed input data, and the basic speed increasing amount may be increased according to vehicle acceleration increase where oil skew phenomenon is substantially formed.

Figure 7:
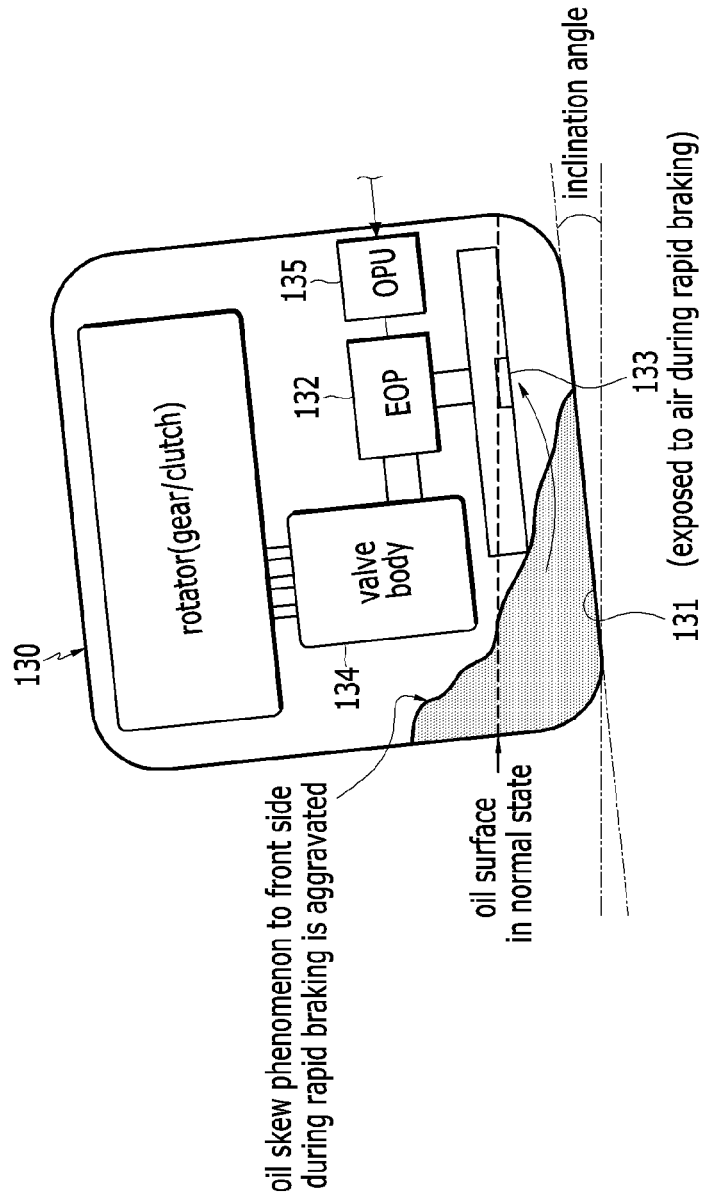
FIG. 7 illustrates oil skew phenomenon by road tilt according to an exemplary embodiment of the present disclosure.

However, the exemplary embodiment of the present disclosure is not limited to this, the EOP speed increasing amount may be adjusted based on road inclination measured by the driving information detector 110. For example, FIG. 7 illustrates oil skew phenomenon based on road tilt according to an exemplary embodiment of the present disclosure. Referring to FIG. 7, oil surface in the oil pan 131 of the transmission 130 is inclined due to the road inclination angle in a normal state when the vehicle is being driven on inclined road. When the vehicle stops after rapid braking, oil skew phenomenon is aggregated by the road inclination angle thus increasing oil skew compared to a horizontal road (e.g., a substantially straight road) as in FIG. 4 and increasing the time for the fluid to return to an original position again.

Thus, the system 100 may further be configured to apply road inclination in the EOP speed increasing mode to increase EOP speed increasing amount and the increasing control time as much as oil skew phenomenon is aggregated by the road inclination angle. Accordingly, the system 100 may be configured to store an EOP speed increasing amount control map for determining EOP speed increasing amount according to vehicle acceleration amount and road inclination angle weight in the EOP speed increasing mode and reference or access the map during EOP speed increasing control. Therefore, control without starting delay in the entrance of the EOP speed increasing mode in any road condition may be possible by increasing control aggregated EOP speed adaptively to oil skew phenomenon aggregated by road inclination angle on which the hybrid vehicle is being driven.

The exemplary embodiment of the present disclosure is not implemented only by the aforementioned apparatus and/or method, and may be implemented through a program for executing a function corresponding to the configuration of the exemplary embodiment of the present disclosure, a non-transitory medium (e.g., non-transitory computer readable medium) in which the program is recorded, and the like, and such an implementation may be easily realized by those skilled in the art from the description of the aforementioned exemplary embodiment.

While this disclosure has been described in connection with what is presently considered to be practical exemplary embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. A system for electric oil pump control of a vehicle, comprising:
    a driving information detector configured to detect driving information based on the driving of the vehicle;
    an operation type transmission of an electric oil pump (EOP) configured to receive and supply transmission oil for operating a clutch; and
    a controller configured to analyze the driving information, and detect an oil skew phenomenon and enter an EOP speed increasing mode when the vehicle stops by rapid braking, and increase EOP speed to increase temporary oil absorption power during rapid starting within a predetermined reference period of time, wherein the controller is configured to detect the rapid braking of the vehicle when the vehicle acceleration is greater than a predetermined reference acceleration by braking operation while the vehicle is being driven, and wherein the controller is configured to determine rapid vehicle starting when a brake off signal is detected in the predetermined reference period of time.

2. The system for electric oil pump control of a vehicle of claim 1, wherein: the driving information detector is configured to detect at least one driving information selected from the group consisting of: an operational displacement of brake pedal, an operational displacement of acceleration pedal, a vehicle speed, a vehicle acceleration, a shift speed, an engine speed, a motor speed, and a road tilt angle.

3. The system for electric oil pump control of a vehicle of claim 1, wherein the transmission includes:
an oil pan that preserves oil at a lower part of the transmission and forms a horizontal oil fluid surface in a normal state;
the EOP configured to receive oil from an oil intake unit submerged in the oil fluid surface by torque of the motor;
a valve body configured to supply the oil from the EOP to a clutch for connecting with an operation shaft and the transmission; and
a pump operation unit including a relay for switching electricity supply of the EOP according to an applied control signal.

4. The system for electric oil pump control of a vehicle of claim 1, wherein the controller is configured to determine that the vehicle is stopping by the rapid braking when the vehicle speed is less than a predetermined reference speed in a rapid braking state.

5. The system for electric oil pump control of a vehicle of claim 4, wherein the controller is configured to operate in the EOP speed increasing mode for a predetermined reference period of time when the vehicle is determined to be stopping in the rapid braking state.

6. The system for electric oil pump control of a vehicle of claim 1, wherein the controller is configured to multiple a basic EOP speed by increasing amount of predetermined multiples to increase the EOP speed.

7. The system for electric oil pump control of a vehicle of claim 6, wherein the controller is configured to increase the increasing amount of the basic EOP speed according to increasing of vehicle acceleration during rapid braking of the vehicle.

8. The system for electric oil pump control of a vehicle of claim 6, wherein the controller is configured to increase the increasing amount of the EOP speed and the increasing control time as the oil skew phenomenon due to the road inclination angle is increased.

9. A method for electric oil pump (EOP) control of a vehicle, comprising:
detecting, by a controller, driving information according to driving of the vehicle;
analyzing, by the controller, the driving information, and detecting an oil skew phenomenon and entering the EOP speed increasing mode when the vehicle stops by rapid braking;
detecting, by the controller, rapid starting of the vehicle when the vehicle restarts within a predetermined reference period of time after the vehicle stops in the EOP speed increasing mode;
increasing, by the controller, temporary oil absorption power by increasing the EOP speed according to the rapid starting of the vehicle;
detecting, by the controller, rapid braking of the vehicle when the vehicle acceleration is greater than predetermined reference acceleration in a braking state;
detecting, by the controller, stopping of the vehicle when the vehicle speed is less than a predetermined reference speed in a rapid braking state; and
entering, by the controller, the EOP speed increasing mode when the rapid braking and stopping conditions of the vehicle are satisfied,
wherein the rapid starting of the vehicle is detected when a brake release signal is input within a predetermined reference period of time in which fluid returns to an original position after the oil skew phenomenon.

10. The method for electric oil pump control of a vehicle of claim 9, further comprising:
increasing, by the controller, the EOP speed by multiplying a basic EOP speed by increasing amount of predetermined multiples according to vehicle acceleration.

11. The method for electric oil pump control of a vehicle of claim 9, further comprising:
returning, by the controller, the EOP speed to an original speed after continuously increasing the EOP speed for a predetermined period of time.

12. The method for electric oil pump control of a vehicle of claim 9, wherein the EOP speed increasing mode is released when rapid starting of the vehicle does not occur within the predetermined reference period of time.

* * * * *